United States Patent [19]

Miwa et al.

[11] Patent Number: 5,194,201

[45] Date of Patent: Mar. 16, 1993

[54] METHOD OF MANUFACTURING HIGH DENSITY SILICON NITRIDE SINTERED BODIES

[75] Inventors: Shinichi Miwa, Nagoya; Seiichi Asami, Okazaki; Takehiro Kajihara, Komaki, all of Japan

[73] Assignee: NGK Insulators, Ltd., Japan

[21] Appl. No.: 747,439

[22] Filed: Aug. 14, 1991

Related U.S. Application Data

[63] Continuation of Ser. No. 457,191, Dec. 26, 1989, abandoned.

[30] Foreign Application Priority Data

Dec. 27, 1988 [JP] Japan .................. 63-327988

[51] Int. Cl.$^5$ ............................................. C04B 35/58
[52] U.S. Cl. ......................................... 264/56; 264/63; 501/92
[58] Field of Search ................. 264/56, 63; 501/92

[56] References Cited

U.S. PATENT DOCUMENTS 4,187,116  2/1980  Lange .................................. 501/92

FOREIGN PATENT DOCUMENTS 0080711  8/1983  European Pat. Off. .
0139793  8/1985  European Pat. Off. .
57-038378  3/1982  Japan .
61-25677  6/1986  Japan .

OTHER PUBLICATIONS

Handbook of Chemistry & Physics, The Chemical Rubber Co., Cleveland, Ohio, 50th Edition 1969-1970, B-153.

*Primary Examiner*—James Derrington
*Attorney, Agent, or Firm*—Parkhurst, Wendel & Rossi

[57] ABSTRACT

A method of manufacturing silicon nitride sintered bodies comprising the steps of preparing a powder consisting essentially of 100 parts by weight of silicon nitride, 2~15 parts by weight of a rare earth element, 0.5~15 parts by weight of a Zr compound and 0.3~5 parts by weight of SiC, molding the thus prepared powder and firing the resulting molding.

3 Claims, 1 Drawing Sheet

METHOD OF MANUFACTURING HIGH DENSITY SILICON NITRIDE SINTERED BODIES

This is a continuation of application Ser. No. 07/457,191 filed Dec. 26, 1989, now abandoned.

BACKGROUND OF THE INVENTION

1. Field of the Invention

The present invention relates to a method of manufacturing high density silicon nitride sintered bodies having an excellent mechanical strength at high temperatures.

2. Related Art Statement

Up to this time, known various methods have been known for manufacturing high density silicon nitride sintered bodies having an excellent mechanical strength. As for one example, there is disclosed, in Japanese Patent Publication No. 61-25677, a method of manufacturing high density silicon nitride sintered bodies wherein a powder consisting essentially of powdery raw materials of silicon nitride and Y, Mg, Zr as sintering aids is formed to obtain a formed body, and the formed body is fired.

According to the known method mentioned above, it is possible to obtain the high density silicon nitride sintered bodies, but it is not possible to achieve a complete crystallization of an intergranular glass phase which affects a mechanical strength at high temperatures. Therefore, there is a drawback such that it is not possible to obtain certainly the silicon nitride sintered bodies having the excellent mechanical strength even at high temperatures.

In order to eliminate the drawback mentioned above, if a reheating treatment technique for crystallizing the intergranular glass phase disclosed in for example, Japanese Patent Publication No. 58-50944, is applied to the above silicon nitride sintered bodies, it is possible to obtain the silicon nitride sintered bodies having the excellent mechanical strength even at high temperatures. However, in this case, since the reheating treatment must be performed after firing the formed body, there is a drawback such that a manufacturing cost of the silicon nitride sintered bodies is increased.

SUMMARY OF THE INVENTION

It is an object of the present invention to eliminate the drawbacks mentioned above and to provide a method of manufacturing silicon nitride sintered bodies which can perform a certain crystallization of an intergranular glass phase without performing a reheating treatment or a temperature-descending control in a furnace.

According to the invention, a method of manufacturing a silicon nitride sintered body comprises the steps of;

preparing a powder consisting of powdery raw materials of 100 parts by weight of silicon nitride, $2 \sim 15$ parts by weight of a rare earth element, $0.5 \sim 15$ parts by weight of Mg compound, $0.5 \sim 13$ parts by weight of a Zr compound, $0.3 \sim 5$ parts by weight of SiC and a forming aid, these amounts being indicated by converted oxide amounts;

molding the thus prepared powder; and firing the resulting molding.

In the above-mentioned construction, into a composition system, which is easy to crystallize the intergranular glass phase, in which a predetermined amount of rare earth element preferably Y or Y and the other rare earth element substituting a part of Y, Mg and Zr are mixed with silicon nitride, a predetermined amount of SiC is further mixed as an additive. Therefore, a crystallizing speed of the intergranular glass phase increases extremely and thus it is possible to achieve a complete crystallization of the intergranular glass phase.

As a result, it is possible to obtain silicon nitride sintered bodies having a high mechanical strength at high temperatures, without performing a reheating treatment or a temperature-descending control in a furnace, by specifically precipitating a J phase solid solution having a high mechanical strength at high temperatures and an excellent fatigue resistance at high temperatures as an intergranular crystalline phase.

An amount of SiC is limited to $0.3 \sim 5$ parts by weight with respect to powdery raw materials of silicon nitride present in an amount of 100 parts by weight. The reasons for limiting an amount of SiC are as follows. If an amount of SiC is less than 0.3 parts by weight, a part or all of fired bodies remain in a non-crystallized state when furnace cooling has a large temperature-descending speed. On the contrary, if an amount of SiC is in excess of 5 parts by weight, mechanical strength at room temperature decreases extremely.

With respect to powdery raw materials of silicon nitride present in an amount of 100 parts by weight, amounts of rare earth element, Mg compound and Zr compound are limited to $15 \sim 2$ parts by weight, $15 \sim 0.5$ parts by weight and $13 \sim 0.5$ parts by weight, respectively, which are indicated by amounts of converted oxides. This is because, if one of the amounts of rare earth element, Mg compound and Zr compound contains more than or less than that of the above limited values, a crystallization due to SiC addition is not promoted effectively.

In this embodiment, a reason for using a rare earth element as one of additives for the silicon nitride sintered bodies is to form a compound having a high melting point between $Si_3N_4$ in the raw materials and $SiO_2$ in impurities of the raw materials thereby. The thus generated compound having a high melting point has better mechanical properties such as a mechanical strength and a creep resistance at high temperatures than those of the other oxide compounds. Therefore, it is possible to obtain silicon nitride sintered bodies having an excellent mechanical strength at high temperatures by using specific chemical compositions according to the invention.

As for firing processes for silicon nitride formed bodies each having the chemical composition according to the invention, it is preferred to fire under a nitrogen or inert gas atmosphere at a temperature of $1550° \sim 1800°$ C. and to effect furnace cooling after the firing as a temperature-descending operation.

Thereby, it is possible to obtain silicon nitride sintered bodies, without effecting the reheating treatment etc., which have an excellent bending strength of more than 600 MPa at an aimed high temperature such as 1200° C., an excellent breakdown point of more than 600 MPa after heated at 900° C. for 1000 hours and an excellent relative density of fired bodies of more than 95%.

DESCRIPTION OF THE PREFERRED EMBODIMENTS

Figure 1:
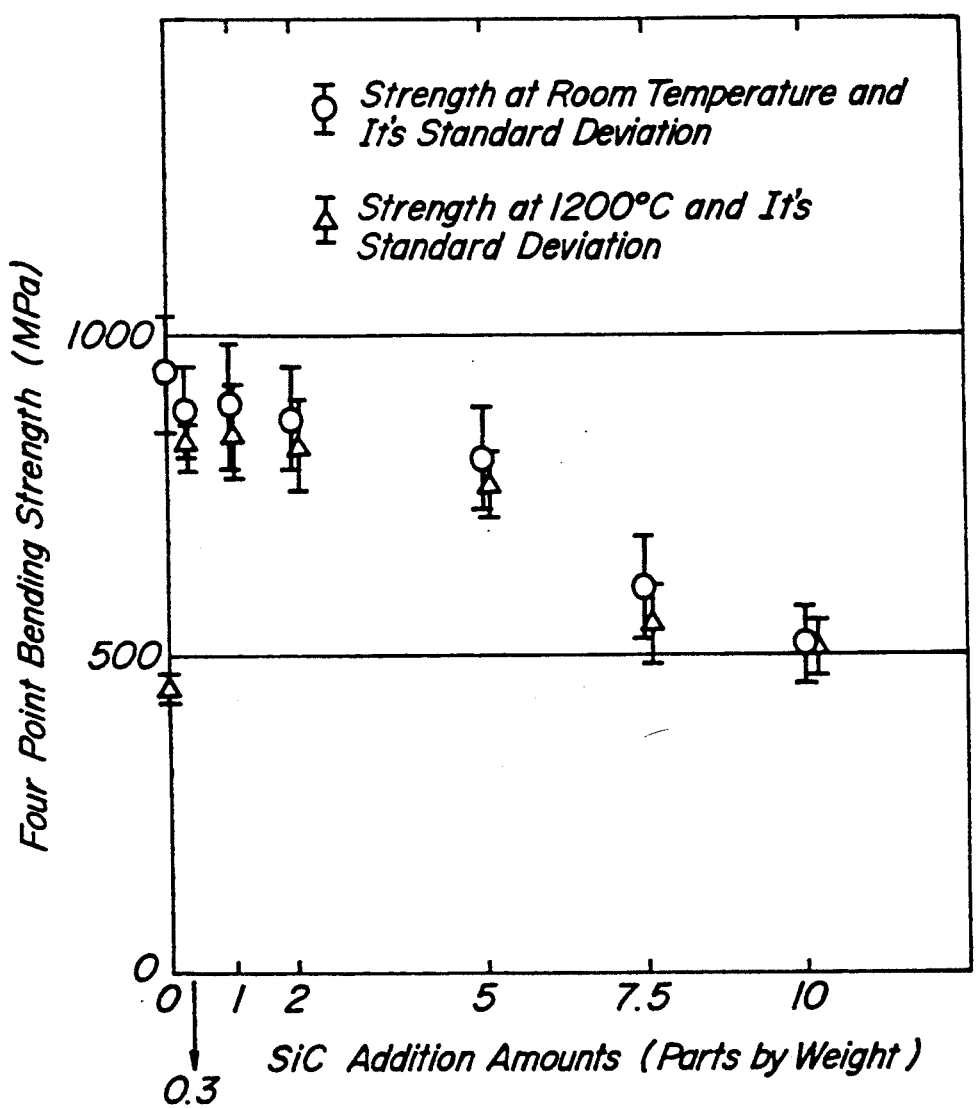
FIG. 1 is a graph showing a relationship between an amount of added SiC and four point bending strength.

Hereinafter, actual embodiments according to the invention will be explained.

EXAMPLE 1

With respect to 100 parts by weight of a powdery raw material of silicon nitride having a purity of 97.2% by weight, an average grain diameter of 0.7 $\mu$m and a BET specific surface area of 11 m$^2$/g, were mixed and formulated 6 parts by weight of $Y_2O_3$ powdery raw material, 4 parts by weight of MgO powdery raw material and 0.6 parts by weight of $ZrO_2$ powdery raw material, each having a purity of 99% by weight, an average grain diameter of 1.2~0.5 $\mu$m and a BET specific surface area of 20~12 m$^2$/g. Then, 0, 0.3, 1.0, 2.0, 5.0, 7.5, 10 parts by weight of SiC powders each having a purity of 99% by weight, an average grain diameter of 0.2~0.5 $\mu$m and a BET specific surface area of 20 m$^2$/g were added to the thus obtained formulation raw material to obtain seven kinds of formulation raw materials. Then, by using iron media coated with nylon resin and having an outer diameter of 7 mm and a nylon resin vessel having an inner volume of about 1.5 liters, 500 g of the media and 500 ml of organic solvent were added to 200 g of the formulation raw material, which was granulated by a vibration mill at a vibration rate of 1200 times/min for 12 hours.

After the granulating step mentioned above, the organic solvent was vapored to obtain dry powders, and all the dry powders were further granulated and passed through a sieve of 149 $\mu$m. The average grain diameter of the granulated dry powders were 70~100 $\mu$m. Then, the granulated dry powders were pressed by using a metal mold, and an isostatic press was performed under a pressure of 5.6 ft/cm$^2$ to obtain formed bodies of 60×60×10 mm. After that, the thus obtained formed bodies were fired at an atmospheric pressure under a nitrogen atmosphere, and then cooled down in the furnace. In this case, temperature-descending speeds measured by a thermocouple were more than 1400° C./hr at 1400° C., more than 700° C./hr at 1200° C. and more than 600° C./hr at 1000° C.

After that, with respect to the sintered bodies, four point bending strengths at room temperature and 1200° C. were measured 5 times, respectively, on the basis of a measuring method for the four point bending strength defined by JIS R 1601. The results of this measuring are shown in FIG. 1. From the results of FIG. 1, it is confirmed that when an amount of the added SiC is in excess of 5 parts by weight, the bending strengths both at room temperature and at high temperature were extremely decreased. Moreover, with respect to the sintered bodies, X-ray diffraction tests were performed to detect intergranular crystal phases of respective fired bodies. From the results of the X-ray diffraction test, it is confirmed that a precipitation of the J phase solid solution is detected in the sintered bodies to which SiC is added, but is not detected in the sintered bodies to which no SiC is added.

Then, the same formulated formed bodies were fired at the same firing condition by using a large size furnace such as that of the previous firing step mentioned above. In this case, temperature-descending speed in the furnace was about ½ with respect to that of the previous furnace, but it shows the same tendency on the mechanical strengths of the fired bodies and the same intergranular crystalline phase.

It should be noted that the J phase solid solution is used to mean a crystalline phase having a caspidine structure of a monoclinic system represented by $M^I_3$ $(M^{II}_2M^{III}_7)$ $M^IM^{IV}_2$ such as $Ca_3(Si_2O_7)CaF_2$. In the silicon nitride sintered body according to the present invention in which the intergranular phase is crystallized, the crystallographic position of $M^I$ is occupied by Ca, a rare earth element such as Y and metal elements such as Mg, Fe, Ni or the like, the crystallographic position of $M^{II}$ is occupied by Si, Al or the like and the crystallographic position of $M^{III}$ is occupied by O, N or the like while the crystallographic position of $M^{IV}$ is occupied by F, O, N or the like.

These crystalline phases can be identified by a powder X-ray diffraction method, and have the same type diffraction curve as that of $Si_3N_4.4Y_2O_3.SiO_2$ shown in JCPDS card No. 32-1451.

EXAMPLE 2

Fired bodies of sample Nos. 1~19 according to the invention in which SiC was added and fired bodies of sample Nos. 21~33 according to the comparative embodiments in which SiC was not added, both having the formulated compositions shown in Table 1 were prepared in the same manner as that of the Example 1. A firing operation was performed at a temperature shown in Table 1 for 0.5 hour. Moreover, in the fired bodies of sample Nos. 32, 33, the temperature-descending speed after firing was controlled at 100° C./hr between 1400° C. and 1000° C., and in the fired bodies of sample Nos. 20~31, a reheating treatment after firing was performed at a temperature of 1150°~1250° C.

With respect to the fired bodies of respective samples, four point bending strengths at room temperature and a high temperature (1200° C.) were measured, and the intergranular crystalline phases were detected, as is the same as the Example 1. Further, a relative density of respective fired bodies was also measured, and a breakdown point after heating at a temperature of 900° C. for 1000 hours was also measured. The results are shown in Table 1.

TABLE 1

| Sample No. | | Formulated composition (parts by weight) | | | | Crystalline phase at grain boundaries | Firing temperature (°C.) | Four point bending strength of fired body (MPa) | | Relative density (%) | Breakdown point (MPa) |
|---|---|---|---|---|---|---|---|---|---|---|---|
| | | $Si_3N_4$ | SiC | $Y_2O_3$ conversion | MgO conversion | $ZrO_2$ conversion | | | RT | 1200° C. | | |
| Present invention | 1 | 100 | 0.3 | 4.0 | 0.5 | 0.5 | J | 1800 | 800 | 720 | 96 | 690 |
| | 2 | 100 | 0.3 | 2.0 | 1.0 | 7.0 | J | 1750 | 830 | 640 | 96 | 650 |
| | 3 | 100 | 0.3 | 2.0 | 5.0 | 8.0 | J | 1700 | 920 | 620 | 97 | 600 |
| | 4 | 100 | 0.3 | 12.0 | 1.0 | 13.0 | J | 1700 | 870 | 800 | 97 | 740 |
| | 5 | 100 | 0.3 | 15.0 | 2.0 | 13.0 | J | 1650 | 860 | 810 | 95 | 710 |
| | 6 | 100 | 0.3 | 4.0 | 2.0 | 4.0 | J | 1750 | 940 | 850 | 98 | 730 |
| | 7 | 100 | 0.3 | 6.0 | 4.0 | 3.0 | J | 1700 | 980 | 800 | 97 | 730 |
| | 8 | 100 | 0.3 | 9.0 | 1.0 | 5.0 | J | 1700 | 810 | 730 | 96 | 660 |

TABLE 1-continued

| Sample No. | | Formulated composition (parts by weight) | | | | | Crystalline phase at grain boundaries | Firing temperature (°C.) | Four point bending strength of fired body (MPa) | | Relative density (%) | Breakdown point (MPa) |
| --- | --- | --- | --- | --- | --- | --- | --- | --- | --- | --- | --- | --- |
| | | Si₃N₄ | SiC | Y₂O₃ conversion | MgO conversion | ZrO₂ conversion | | | RT | 1200° C. | | |
| | 9 | 100 | 0.3 | 6.0 | 4.0 | 5.0 | J | 1700 | 840 | 720 | 96 | 650 |
| | 10 | 100 | 0.3 | 7.0 | 7.0 | 2.0 | J | 1700 | 780 | 710 | 97 | 650 |
| | 11 | 100 | 0.3 | 5.0 | 4.0 | 2.0 | J | 1750 | 870 | 700 | 96 | 670 |
| | 12 | 100 | 0.3 | 2.0 | 15.0 | 13.0 | J | 1700 | 770 | 650 | 95 | 600 |
| | 13 | 100 | 0.3 | 6.0 | 4.0 | 0.3 | J | 1650 | 880 | 830 | 98 | 750 |
| | 14 | 100 | 0.3 | 6.0 | 4.0 | 0.3 | J | 1550 | 720 | 680 | 95 | 620 |
| | 15 | 100 | 1.0 | 6.0 | 4.0 | 0.3 | J | 1650 | 930 | 890 | 98 | 770 |
| | 16 | 100 | 2.0 | 6.0 | 4.0 | 1.0 | J | 1700 | 950 | 870 | 97 | 760 |
| | 17 | 100 | 5.0 | 8.0 | 5.0 | 1.0 | J | 1700 | 900 | 820 | 96 | 750 |
| | 18 | 100 | 0.3 | 6.0 Yb₂O₃ 2 | 5.0 | 0.8 | J | 1720 | 810 | 740 | 96 | 700 |
| | 19 | 100 | 0.3 | 4.0 Er₂O₃ 2 | 4.0 | 0.6 | J | 1720 | 830 | 710 | 96 | 680 |
| Comparative example | 21 | 100 | 0 | 4.0 | 0.5 | 0.5 | — | 1800 | 880 | 490 | 97 | 380 |
| | 22 | 100 | 0 | 2.0 | 5.0 | 8.0 | — | 1700 | 990 | 500 | 97 | 400 |
| | 23 | 100 | 0 | 6.0 | 4.0 | 0.3 | — | 1650 | 1000 | 450 | 98 | 360 |
| | 24 | 100 | 0 | 2.0 | 15.0 | 13.0 | — | 1700 | 750 | 360 | 96 | 320 |
| | 25 | 100 | 0 | 9.0 | 1.0 | 5.0 | — | 1700 | 850 | 580 | 96 | 370 |
| | 26 | 100 | 0 | 7.0 | 7.0 | 2.0 | — | 1700 | 840 | 480 | 97 | 350 |
| | 27 | 100 | 0 | 15.0 | 2.0 | 13.0 | — | 1650 | 850 | 510 | 96 | 320 |
| | 28*¹ | 100 | 0 | 6.0 | 4.0 | 0.3 | K + J | 1650 | 860 | 770 | 95 | 520 |
| | 29*¹ | 100 | 0 | 8.0 | 5.0 | 1.0 | H + K + J | 1700 | 820 | 740 | 94 | 510 |
| | 30*¹ | 100 | 0 | 6.0 | 4.0 | 0.3 | K + J | 1650 | 850 | 710 | 96 | 500 |
| | 31*¹ | 100 | 0 | 6.0 | 4.0 | 0.3 | K + J | 1650 | 830 | 680 | 95 | 480 |
| | 32*² | 100 | 0 | 6.0 | 4.0 | 0.3 | H + K + J | 1650 | 820 | 690 | 96 | 500 |
| | 33*² | 100 | 0 | 8.0 | 5.0 | 1.0 | H + K + J | 1700 | 810 | 700 | 95 | 450 |

(Note)
*¹Reheating process
No. 28: 1150° C. × 3 hrs,
No. 29: 1200° C. × 3 hrs,
No. 30: 1200° C. × 3 hrs,
No. 31: 1250° C. × 3 hrs
*²Performing temperature-descending control From the results shown in Table 1, the sintered bodies of the sample Nos 1~19 according to the present invention in which the intergranular phase is only J phase solid solution have the higher bending strengths both at room temperature and high temperature, the same or a little higher relative density and the higher breakdown point after heating at 900° C. for 1000 hours as those of the fired bodies of the sample Nos. 21~33 according to the comparative embodiments.

In Table 1, K is a crystalline phase of wollastonite structure having the same type diffraction curve as that of YSiO₂N shown in JCPDS card No. 31-1462. Moreover, H is a crystalline phase of an apatite phase.

Moreover, the apatite phase is a crystalline phase of an apatite structure having the same type diffraction curve as a crystalline of hexagonal system such as Y₁₀(SiO₄)₆N₂ typically expressed by JCPDS card No. 30-1462. In the fired bodies in which more than two kinds of rare earth elements are added, the crystallographic position of the Y ion in Y₁₀(SiO₄)₆N₂ crystalline is occupied by the rare earth element ions, and they are completely solidified. Further, when the crystallographic position of N is occupied by O, the crystalline phase is maintained in an electrically neutral condition, and thus the crystallographic position Y becomes vacant.

As can be seen from the above explanation, in the silicon nitride sintered body and the manufacturing method thereof according to the present invention, since the silicon nitride formed body, in which predetermined amounts of a rare earth element, Mg and Zr and further a predetermined amount of SiC are added to raw materials of silicon nitride and fired, it is possible to obtain a high density silicon nitride sintered body having an excellent mechanical strength at high temperatures, without effecting a reheating treatment.

What is claimed is:

1. A method of manufacturing a silicon nitride sintered body comprising the steps of:
    preparing a powder of powdery raw materials consisting of 100 parts by weight of silicon nitride, 2-15 parts by weight of a rare earth element, 0.5-15 parts by weight of an Mg compound, 0.5-15 parts by weight of a Zr compound, 0.3-5 parts by weight of SiC having an average particle size of 0.2-0.5 μm, and a forming aid, each amount of the powdery raw materials being designated by converted oxide amounts;
    molding the prepared powder; and
    firing the resulting molding at atmospheric pressure.

2. The method of claim 1, wherein the rare earth element is selected from the group consisting of Y and another rare earth element substituted for a portion of Y.

3. A method of manufacturing a silicon nitride sintered body comprising the steps of:
    preparing a powder of powdery raw materials consisting of 100 parts by weight of silicon nitride, 2-15 parts by weight of a rare earth element, 0.5-15 parts by weight of an Mg compound, 0.5-13 parts by weight of a Zr compound, 0.3-2.0 parts by weight of SiC having an average particle size of 0.2-0.5 μm, and a forming aid, each amount of the powdery raw materials being designated by converted oxide amounts;
    molding the prepared powder; and
    firing the resulting molding at atmospheric pressure.

* * * * *